United States Patent Office 3,639,491
Patented Feb. 1, 1972

3,639,491
OXYCHLORINATION OF 1,1,2-TRICHLORO-
ETHANE TO TRICHLOROETHYLENE
Larry F. Wright, Lake Jackson, Tex., assignor to The
Dow Chemical Company, Midland, Mich.
No Drawing. Filed July 19, 1968, Ser. No. 745,973
Int. Cl. C07c 21/10, 17/10
U.S. Cl. 260—654 D
4 Claims

ABSTRACT OF THE DISCLOSURE

The present invention relates to the production of trichloroethylene from 1,1,2-trichloroethane (β-trichloroethane) by passing the latter in the vapor phase over an oxychlorination catalyst in the presence of oxygen at an elevated temperature and under super-atmospheric pressure. The method of the present invention allows increased productivity per catalyst volume than heretofore disclosed by the art processes as well as greater selectivity of the β-trichloroethane to trichloroethylene per pass.

BACKGROUND OF THE INVENTION

Trichloroethylene, or 1,1,2-trichloroethylene, is a highly desirable, commercially valuable chlorinated solvent useful in cleaning operations to remove grease and soluble dirt. It is especially useful in cleaning metal which has been machined or to remove grease prior to painting metal parts for protection from corrosion and to enhance the aesthetic appearance thereof.

1,1,2-trichloroethane is readily available as a by-product of numerous direct chlorination and oxychlorination processes. The direct chlorination or oxychlorination of ethylene, vinyl chloride and 1,2-dichloroethane are examples of processes which provide the 1,1,2-trichloroethane (β-trichloroethane) as by-product which is used as the starting material of the present invention. The direct chlorination of this by-product by the prior art techniques results in the production of the desired 1,1,2-trichloroethylene, but with the disadvantage of producing large amounts of hydrogen chloride.

The reaction of the β-trichloroethane with oxygen at elevated temperatures and pressures over a copper catalyst is disclosed in U.S. Pat. No. 2,342,100. This process produces the desired trichloroethylene but in low yields with attendant production of large quantities of perchloroethylene. Further, the catalyst productivity to the desired product, trichloroethylene, is low.

The present invention is directed to the latter process with the purpose to improve both the yield to trichloroethylene and the conversion to either recyclable by-products or valuable by-products which can be employed per se or cracked to trichloroethylene.

BRIEF DESCRIPTION OF INVENTION

In accordance with the process of the present invention the trichloroethane and oxygen (as air) are heated separately and then mixed in a molar ratio of between about 0.8 to about 2 moles of the chlorinated hydrocarbon to 1 mole of oxygen just prior to passing the mixture into the catalyst bed. The bed is maintained at a temperature of from about 340° C. to about 450° C. A minor amount, less than 4%, of perchloroethylene is produced. The reaction preferably is conducted under a slight pressure of from about 25 to 50 p.s.i.g., but pressures from atmospheric pressure up to 100 p.s.i.g. can be used.

The method of the present invention gives conversions of the starting reactants, β-trichloroethane and oxygen, of greater than 90 percent. Selectivity of the converted reactants to trichloroethylene is higher than 40 percent with another 40 percent going to cis-trans dichloroethylene and symmetrical and unsymmetrical-tetrachloroethane. This marked improvement in the process is attributable to the nature of the catalyst and the low temperature of the reaction. An advantage also realized from the present process is the low oxidation products, CO and $CO_2$, 7 percent compared to 10 percent in the art process.

DETAILED DESCRIPTION OF INVENTION

An insulated and jacketed acid-resistant reactor, for example a long tube made of Inconel 600 (an alloy of nickel, chromium and iron), was packed with Norton LA3035 5/16" ring type support (activated alumina) which had been burdened with 3% copper as $CuCl_2 \cdot 2H_2O$ and 3% potassium as KCl. A eutectic mixture of biphenyl and biphenyl oxide was used as a heat transfer agent in the jacket surrounding the tube. The catalyst composition can be varied between about 0.5 to about 8% copper, using various amounts of potassium of from about 50% to 100% by weight of the copper burden.

The reactants were preheated then mixed and fed to the reactor at the following rates: 267.9 lbs. per day of trichloroethane (1,1,2), and 33.3 lbs. per day of oxygen (as air) at a pressure of 40 p.s.i.g. Temperatures at the inlet and outlet were 349° C. and 370° C., respectively, and the maximum temperature of 397° C. occurred at points 14 and 16 feet from the inlet. Conversion of trichloroethane (1,1,2) was 97.4% and the yield of trichloroethylene (1,1,2) was 44%. Oxidation loss was 7.0%.

The full analysis of the run is set forth below in tabular form:

Recovery data

Chlorinated hydrocarbons (lbs./day):

| | |
|---|---:|
| Vinylidene chloride—R | 2.73 |
| Trans-dichloroethylene—R | 16.69 |
| Cis-dichloroethylene—R | 24.58 |
| Carbontetrachloride and chloroform | 2.72 |
| Trichloroethylene | 116.28 |
| Perchloroethylene | 8.36 |
| Beta-trichloroethane—R | 5.89 |
| Unsym-tetrachloroethane—R | 11.90 |
| Sym-tetrchloroethane—R | 39.60 |
| Pentachloroethane—R | 6.42 |
| Total | 235.17 |

Gases in vent (lbs./day):

| | |
|---|---:|
| CO | 2.33 |
| $CO_2$ | 8.68 |
| $O_2$ | 2.89 |
| Total | 13.80 |

Aqueous layer (lbs./day):

| | |
|---|---:|
| HCl | 8.13 |
| $H_2O$ | 26.27 |
| Percent conversion (beta-trichloroethane) | 97.4 |
| Percent conversion ($O_2$) | 91.4 |
| Percent beta-trichloroethane loss (oxidation) | 7.0 |
| Percent yield to trichloroethylene (single pass) | 44.0 |

Those products which have the letter R following the name above are recyclable and will produce trichloroethylene or perchloroethylene in the approximate ratio as these two products are produced in the single pass.

In a comparison with a similar reaction in the published patent literature, (Runs A and B of U.S. Patent No. 2,342,100 with data converted directly to lb./day basis), the advantages of the instant process can be shown. The data is shown below:

|  | Run according to present invention | Run according to prior art. | |
|---|---|---|---|
|  |  | Run A | Run B |
| Catalyst bed | Fixed | Fixed | 2-bed fixed. |
| Catalyst material | CuCl$_2$/KCl | CuO | Same. |
| Support material | Alumina (LA3035) | Porous brick | Do. |
| Liters of catalyst | 6.97 | 1.50 | 3.0. |
| Feed rate β-tri (lb./lb. of cat./day) | 3.84 | 3.05 | 1.52. |
| β-Tri/O$_2$ (molar ratio) | 1.0/0.5 (as air) | 1.0/0.635 (as O$_2$) | 1.0/0.324 (as O$_2$). |
| Percent yield to trichloroethylene (per pass) | 44–50 | 21.5 [1] | 35.9. |
| Oxidation loss (percent carbon) | 5.0–7.0 | 10.6 | 11.5. |
| Reaction temperature (° C.) | 380–411 | 375–525 | 444–480. |
| β-Tri conversion | 97.4 | 98 [2] | 100%. |

[1] $\frac{2.25 \text{ moles trichloroethylene obtained}}{10.47 \text{ moles } \beta\text{-trichloroethane feed}}$

[2] $\frac{(\text{moles } \beta\text{-trichloroethane feed}) - (\text{moles recovered})}{\text{moles } \beta\text{-trichloroethane feed}}$

I claim:

1. In the process for the production of 1,1,2-trichloroethylene by reacting 1,1,2-trichloroethane over a copper burdened carrier catalyst in the presence of oxygen, and wherein at least 80% of the product stream produced thereby is comprised of 1,1,2-trichloroethylene cis- and trans dichloroethylene and the isomeric mixture of tetrachloroethanes, the improvement which comprises (1) employing from about 0.8 to about 2 moles of 1,1,2-trichloroethane per mole of oxygen, (2) reacting at a temperature of between about 340° and 450° C. (3) conducting the reaction under a superatmospheric pressure of at least 25 p.s.i.g. to about 100 p.s.i.g. and (4) the copper burden on carrier being 0.5 to about 8% by weight Cu as CuCl$_2$ and 50 to 100% based on the copper of K as KCl.

2. The process of claim 1 in which the ratio of trichloroethane:oxygen is 2:1.

3. The process of claim 1 in which the ratio of trichloroethane:oxygen is 1:1.

4. The process of claim 1 wherein the byproducts produced are recycled with the feed 1,1,2-trichloroethane.

References Cited

UNITED STATES PATENTS 2,342,100   2/1944   Cass _____ 260—654 D
2,951,103   8/1960   Ellsworth et al. ___ 260—654 D LEON ZITVER, Primary Examiner J. A. BOSKA, Assistant Examiner U.S. Cl. X.R.

260—658 R

PO-1050
(5/69)

UNITED STATES PATENT OFFICE
CERTIFICATE OF CORRECTION

Patent No. 3,639,491     Dated    1 February 1972

Inventor(s)   Larry F. Wright

It is certified that error appears in the above-identified patent and that said Letters Patent are hereby corrected as shown below:

Column 2, line 44, change "Sym-tetrchloroethane-R" to --Sym-tetrachloroethane-R--.

Column 3, in the next to the last line of the table, under "Run B" change "444-480." to --440-480.--.

Signed and sealed this 26th day of September 1972.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,639,491          Dated  1 February 1972

Inventor(s)    Larry F. Wright

It is certified that error appears in the above-identified patent and that said Letters Patent are hereby corrected as shown below:

Column 3, line 22, insert --- , --- following "1,1,2-trichloroethylene".

Signed and sealed this 9th day of January 1973.

(SEAL)
Attest:

EDWARD M. FLETCHER, JR.                ROBERT GOTTSCHALK
Attesting Officer                      Commissioner of Patents